May 22, 1923.

T. H. LAURY 1,455,917

SAW SHARPENING AND SETTING MACHINE

Filed July 26, 1921    4 Sheets-Sheet 1

WITNESSES

INVENTOR
TITUS H. LAURY
BY
ATTORNEYS

May 22, 1923.

T. H. LAURY 1,455,917

SAW SHARPENING AND SETTING MACHINE

Filed July 26, 1921   4 Sheets-Sheet 3

WITNESSES

INVENTOR
TITUS H. LAURY
BY
ATTORNEYS

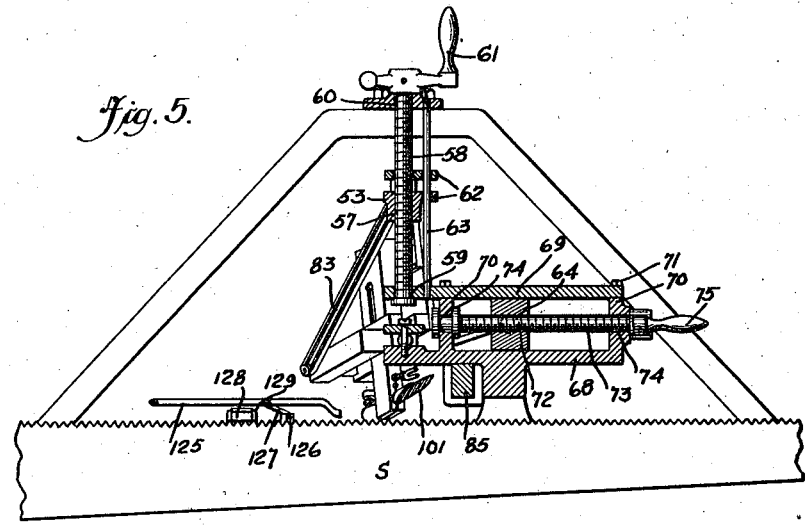
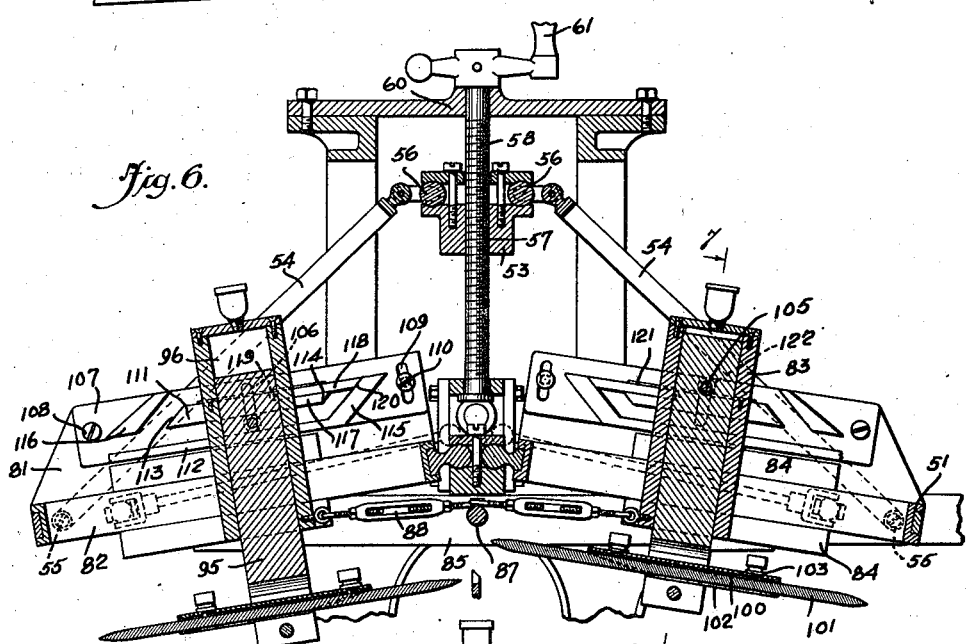

Patented May 22, 1923.

1,455,917

UNITED STATES PATENT OFFICE.

TITUS H. LAURY, OF DETROIT, MICHIGAN.

SAW SHARPENING AND SETTING MACHINE.

Application filed July 26, 1921. Serial No. 487,670.

*To all whom it may concern:*

Be it known that I, TITUS H. LAURY, a citizen of the United States, and a resident of Detroit, in the county of Wayne and State of Michigan, have invented a new and Improved Saw Sharpening and Setting Machine, of which the following is a full, clear, and exact description.

This invention relates to a machine for sharpening and setting the teeth of a saw, the same being in the nature of an improvement over a similar machine covered by United States Letters Patent No. 1,157,558, granted October 19, 1915.

The invention contemplates for one of its objects a machine for holding and feeding a saw to present the same to reciprocating files to accurately sharpen the teeth, whereby the necessity of jointing the same is eliminated.

As a further object the invention affords means for adjusting the transverse and longitudinal angularity of the files, said means being operable either when the machine is in or out of operation.

The invention further contemplates a mechanism for intermittently feeding the saw which includes means for regulating the extent of movement whereby to afford a wide range of adjustment and render the machine applicable to saws of various sizes.

A further object in view resides in the provision of effective and accurate means for associating the files with the machine to insure the proper relative position of the cutting edges.

The invention further contemplates a machine for sharpening and setting the teeth of a saw which is comparatively simple in its construction, inexpensive to manufacture and install, and which is thoroughly reliable and highly efficient in its purpose.

With the above recited and other objects in view, some of which will appear as the nature, purpose and operation is more clearly understood, reference is had to the following specification, the appended claims and the accompanying drawings, in which a single and preferred embodiment of the invention is illustrated, it being understood that variations and modifications which properly fall within the scope of the appended claims, may be resorted to when found expedient.

In the drawings—

Fig. 5 is a fragmentary vertical longitudinal sectional view taken approximately on the line indicated at 5—5 of Fig. 2.

Fig. 6 is a fragmentary transverse sectional view indicated approximately on the line 6—6 of Fig. 1.

Fig. 7 is a sectional view taken approximately on the line 7—7 of Fig. 6.

Figure 1:
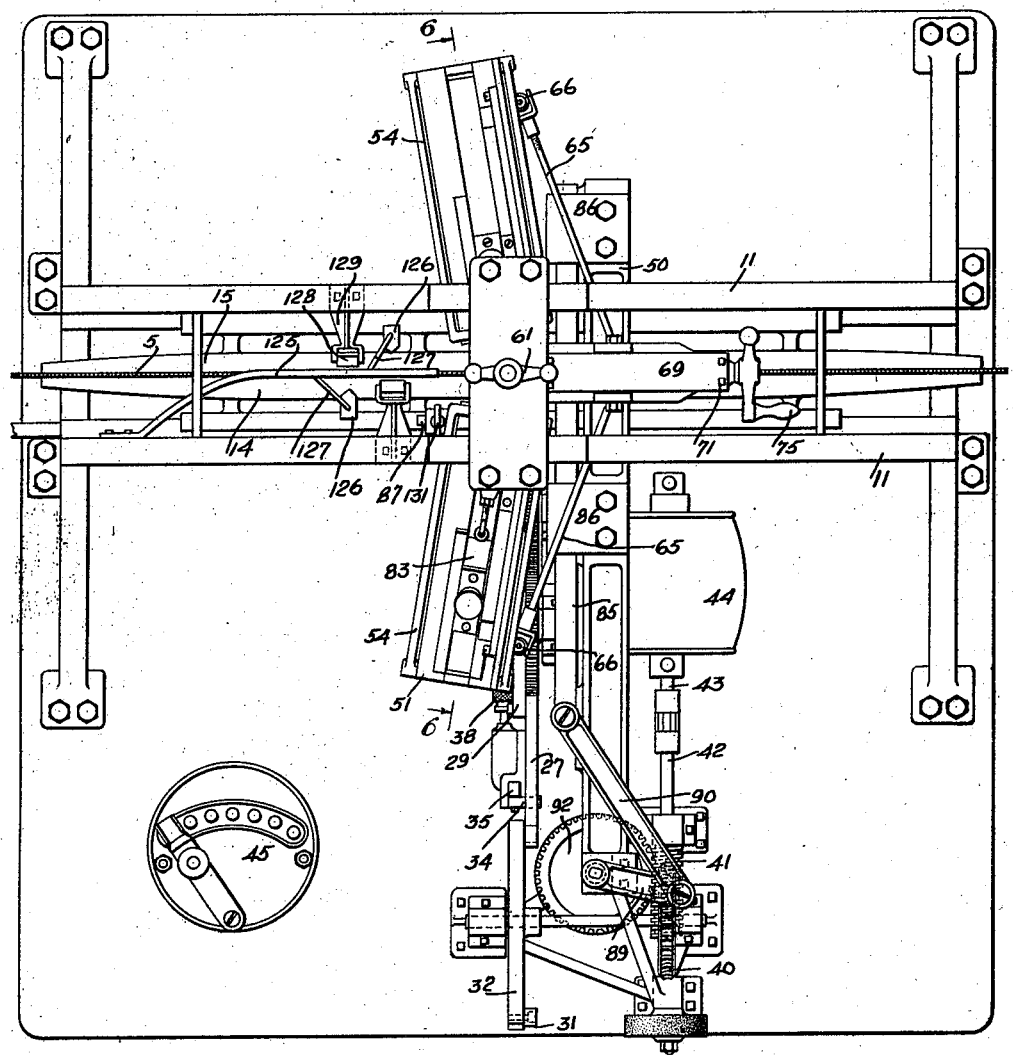
Figure 1 is a plan view of the machine.
Figure 2:
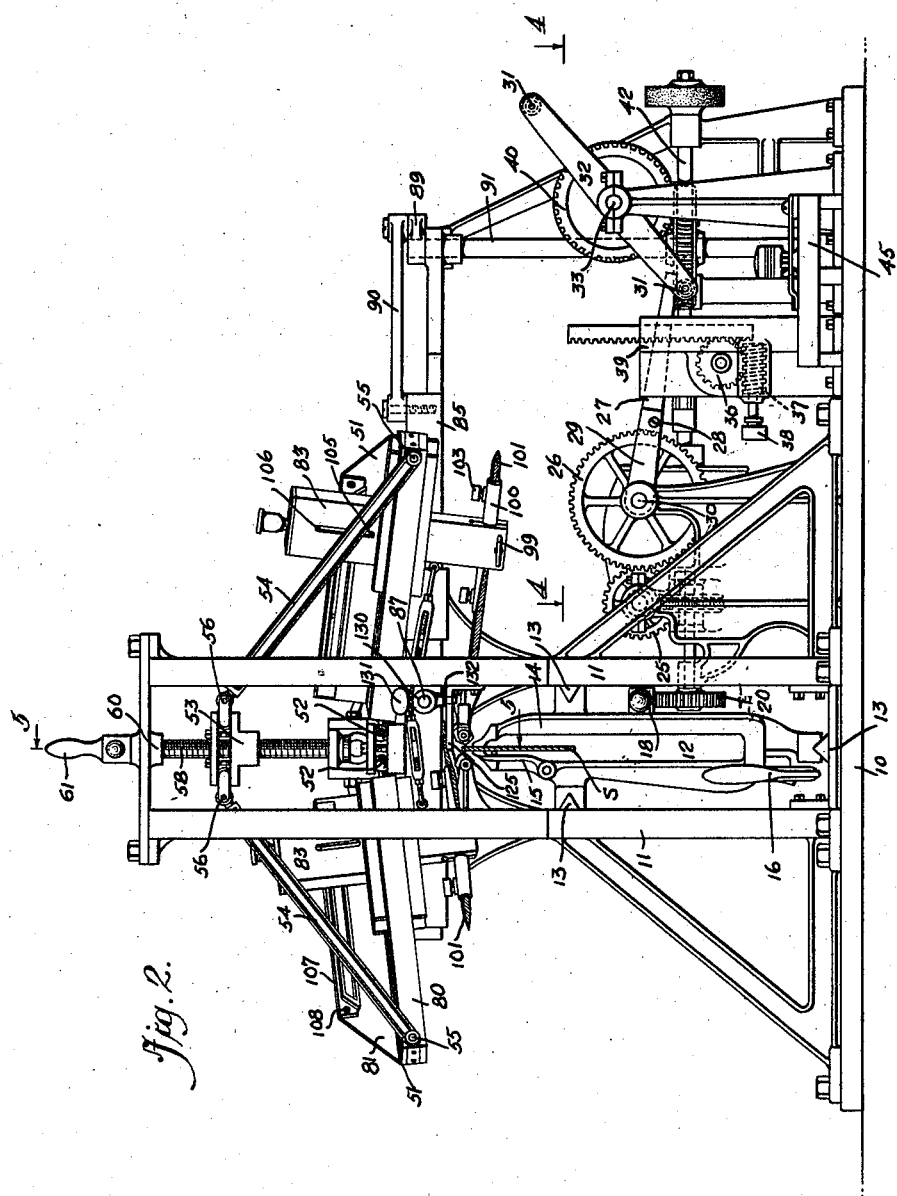
Fig. 2 is an end view thereof.
Figures 3, 4:
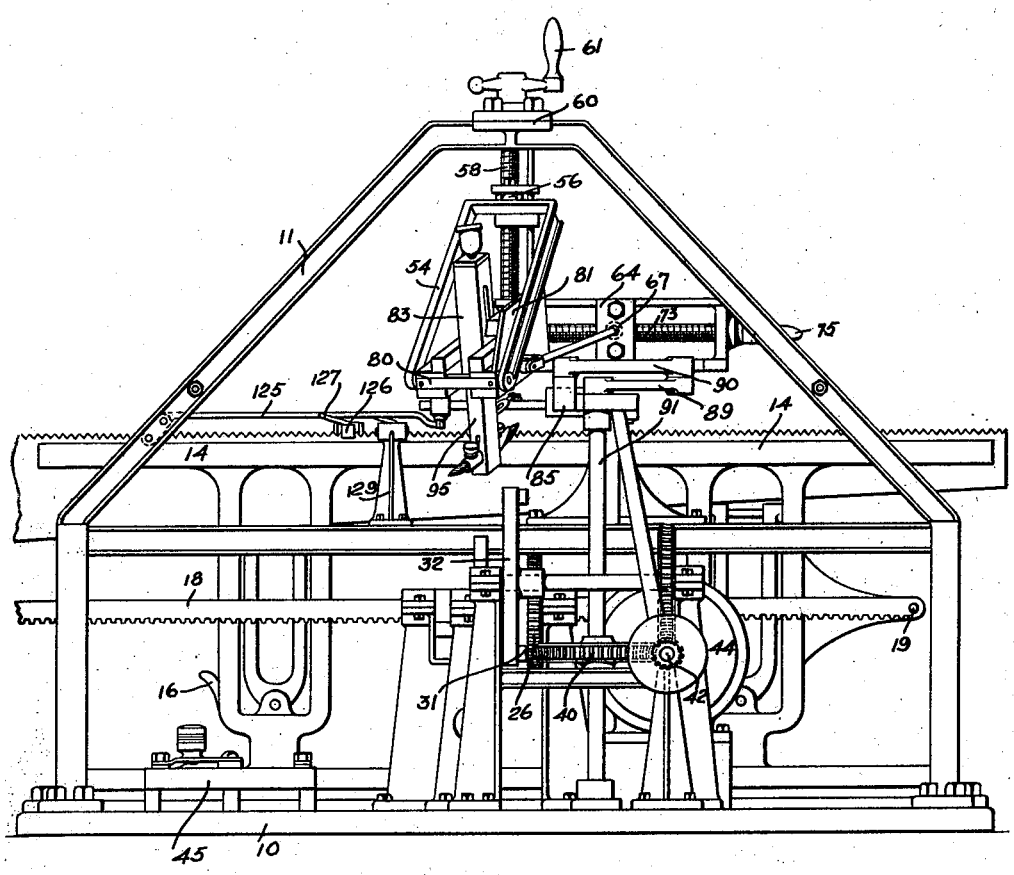
Fig. 3 is a side elevation of the same.
Fig. 4 is a fragmentary sectional plan view taken approximately on the line indicated at 4—4 in Fig. 2.

Referring to the drawings by characters of reference, the machine includes or is attached to any suitable form of base 10 having longitudinal upstanding parallel frame members 11 between which any suitable form of saw clamping device 12 is mounted on the guide tracks or rails 13 for longitudinal movements. The saw clamping device includes a fixed jaw 14 and a movable jaw 15 between which the saw blade S is clamped by a suitable form of clamp lever 16. The mechanism for actuating the saw clamping device to feed the saw through the machine includes a rack 18 pivoted to the saw clamping device as at 19, the teeth of which are engageable with the teeth of a pinion 20 secured to a stub shaft 21 which in turn has secured thereto a worm gear 22 which is driven by a worm 23 on a shaft 24. The shaft 24 has keyed thereon a gear 25 which meshes with a drive gear 26. The drive gear 26 is intermittently driven by means of a clutch arm 27 eccentrically pivoted as at 28 to an arm 29 loosely mounted on the drive gear shaft 30. The free extremity of the clutch arm is intermittently tripped by the trunnions 31 carried by the opposite ends of a double crank arm 32 keyed to the countershaft 33. In the arrangement disclosed the clutch arm 27 is designed to gravitate when disengaged by the trunnions and the same is arrested in its downward movement by a vertically adjustable stop lug 34. The stop lug 34 is carried by a vertically mounted rack bar 35 actuated by a worm pinion 36 the teeth of which are in turn operated by the worm 37 which is controlled by the manipulating handle 38. If desired one face of the rack 35 may be graduated, whereby it will coact with the upper end of a casing 39 in which it is mounted to indicate the extent of movement of the saw upon the adjustment of the stop lug. The countershaft is rotated through the medium of a worm gear 40 keyed thereon, which worm gear meshes with the worm 41 on the drive shaft 42 coupled to the motor shaft 43 of any suitable form of motor 44. The motor is preferably electrically connected with a rheostat 45 for controlling the speed of the same, said rheostat being mounted on the base 10. From the foregoing it will be seen that a means for supporting and intermittently feeding a saw through the machine is provided which means is adjustable to regulate the extent of each intermittent movement whereby to accommodate the machine to saws of various sizes.

The mechanism for sharpening the teeth comprises a transversely disposed stationary supporting frame 50 to which a pair of laterally projecting guideways 51 are connected by universal joints 52. The outer free ends of the guideways 51 are connected to a vertically adjustable block 53 by the supporting bars 54 which are pivoted to said free ends as at 55 and connected by a universal joint 56 at their opposite ends to the block 53. The block 53 is provided with a vertical interiorly threaded bore 57 which is engaged by a vertically disposed threaded shaft 58 mounted at its opposite ends in the bearings 59 and 60. The upper extremity of the shaft 58 extends upwardly through the bearing 60 and has secured thereto a manipulating crank handle 61 which is designed to rotate the shaft 58 for the purpose of raising and lowering the block 53. The block is provided with rearwardly extending apertured ears 62 through which a guide rod 63 extends, said guide rod being anchored at its lower and upper ends in the bearings 59 and 60 and functioning to prevent rotation of the block. By this arrangement the transverse or horizontal adjustments in the angularity of the guideways is obtained. The guideways are further connected at their free outer ends to a longitudinally adjustable nut or block 64 by the transversely extending coacting rods 65 connected respectively at its opposite ends by the universal joints 66 and 67 to the free extremities of the guideways. The nut or block 64 is mounted in the vertically spaced parallel guide rails 68 and 69, the latter being detachably associated with the upturned extremities 70 of the former by the fastening elements 71. The nut 64 is provided with a longitudinal threaded bore 72 which receives a longitudinal threaded shaft 73, the opposite extremities of which are mounted in bearing apertures 74 in the extremities 70. The rear end of the shaft 73 has mounted thereon a manipulating crank handle 75 which is designed to rotate the shaft in either direction for the purpose of moving the nut or block 64 longitudinally of the machine. The longitudinal movement of the block 64 through the medium of the connecting rod 65 functions to effect longitudinal angular adjustments of the guideways.

Each of the guideways 51 is provided with horizontal and vertical flanges 80 and 81. The horizontal flange is longitudinally and vertically slotted as at 82 and has slidably mounted therein a vertically disposed reciprocating head 83. The heads 83 have secured to the opposite sides thereof vertically spaced parallel rails 84 which engage and coact with the upper and lower surfaces of the flanges 80 at the opposite sides of the slot 82. The means for reciprocating the heads 83 includes a slide bar 85 mounted in the bearing yokes 86 carried by the transverse stationary frame 50. The slide bar is provided with a forwardly projecting pin 87 which is respectively connected by the turn buckles 88 to the heads 83. The slide bar is connected at one extremity to a crank 89 by a pitman or link 90, said crank being secured to a vertical drive shaft 91 which has keyed thereon a worm gear 92 meshing with the worm 41 on the drive shaft 42 whereby the reciprocating heads are simultaneously actuated with the saw feeding mechanism from the same motor. The reciprocating heads 83 are of hollow construction to accommodate the file supporting members 95 snugly received by the vertical openings 96 therethrough. The file supporting members 95 depend from the lower ends of the heads 83 and the depending portions thereof are split transversely and inwardly from their lower ends to provide clamping jaws 97, the inner faces of which are provided with opposed semi-circular and transversely extending grooves 98 medially thereof.

The outer extremity of the jaws 97 are transversely apertured and threaded to receive the shank of a set screw 99 for effecting a clamping action of the jaws against the sides of a split tubular file holder 100. The files 101 are telescopically received by the file holders and are preferably of triangular formation in cross section. In associating the files with the file holders one flat side of the file is arranged uppermost and one edge is received between the edges of the file holder defined by the split 102. Retaining screws 103 are threaded through apertures in the file holder and bear against the flat surface of the file to force the oppositely disposed angular edge thereof into the split. After the file is thus associated with the file holder, the same is arranged between the clamping jaws 97 and the set screw 99 is manipulated to clamp the file and file holder in place. The file supporting members are mounted in the heads 83 for vertical reciprocatory movement and said movement is imparted thereto by means of the transversely disposed pins 105 which extend through an opening in the file supporting members and the vertical slots 106 in the side walls of the heads 83. The rear extremity of each pin 105 coacts with a plate 107 pivotally secured at its outer extremity as at 108 to the vertical flange 81 of the guideway. The opposite or inner end of the plate is provided with an arcuate slot 109 concentric to the pivot 108 through which a securing screw 110 is passed, said securing screw being anchored in the flange 81. The plates 107 are provided with forwardly projecting parallel upper and lower ribs 111 and 112, the former being beveled at its opposite ends as at 113 and 114. The lower rib 112 is provided at its inner end with an angularly disposed upwardly projecting extension 115 spaced from the beveled end 114 and corresponding to the angularity of the same. An angularly disposed rib 116 projects forwardly from the plate and is spaced from the end 113 and conforms to the angularity of said end. The upper surface of the inner end of the rib 111 is rabbeted as at 117 to receive an arm 118 pivoted at its inner extremity at 119 and beveled as at 120 at its outer extremity to coact with and seat against the inner faces of the extension 115. The arm or gate 118 is normally held in seated position by means of a leaf spring 121 secured to the upper side of the rib 111. The rear extremity of each pin 105 has mounted thereon an anti-friction roller 122 which travels within the horizontal groove defined by the ribs 111 and 112 and the vertical inclined grooves defined by the opposite ends of the rib 111, the rib 116 and the extension 115 and over the upper surface of the rib 111, the weight of the file supporting member 95 serving to effect the engagement of said anti-friction roller with the upper surface of said rib 111.

In operation of the machine the saw S is clamped between the jaws 14 and 15 of the clamping device 12 to dispose the teeth thereof in proper relation to the path of movement of the files 101. The manipulating crank handles 61 and 75 are then manipulated to obtain the proper vertical and horizontal angularity of the guideways 50 and 54. The rack bar 35 is vertically adjusted by means of the manipulating handle 38 to limit the movement of the clutch arm 27 whereby to regulate the feed of the saw to correspond with the gage of the teeth. When the motor is started the motor shaft 43 drives the drive shaft 42 thereby actuating the worm 41 to rotate the counter shaft 33 through its engagement with the worm gear 40. As the counter shaft 33 is secured to the double crank 32 the same is rotated therewith to alternately trip and lift the clutch arm 27 by the engagement of the trunnions 31 therewith. The tripping and lifting of the clutch arm 27 causes its inner end to frictionally engage and grip the periphery of the gear 26 to intermittently turn the same, the extent of said intermittent turning movement being regulated by the lug 34 of the rack 35. The intermittent turning movements of the gear 26 are imparted to the gear 25, the shaft 24 upon which it is mounted and the worm 23, thence to the worm gear 22, shaft 21 and pinion 20. The intermittent movement is imparted to the saw clamping device by the engagement of the pinion 20 with the rack 18 whereby the saw is intermittently fed longitudinally through the machine to present the teeth to the files. By pivotally connecting the rack 18 as at 19 to the saw clamping device, the teeth of the rack are gravitationally maintained in engagement with the pinion 20, thus permitting the operator to disengage the same by lifting the outer free end of the rack and if desired move the saw clamping device rearwardly to reset the machine. Simultaneously the slide bar 85 will be reciprocated by the pitman 90 through the medium of the crank 89 secured to the shaft 91 by the engagement of the worm gear 92 with the worm 41. The reciprocations of the slide bar will be imparted to the heads 83 by the turn buckle connections 88 between the heads and the forwardly projecting pin 87 of the slide bar. The inward movement of one head 83 will be effected simultaneously with the outward movement of the other head whereby the file of the inwardly moving head will be acting upon one tooth, while the other file will be inactive. This is accomplished due to the fact that the pin 105 of the inwardly moving head is engaged in the groove defined by the ribs 111 and 112. When the head approaches the inner limit of its movement, the pin 105 coacts with the inner surface of the extension 115 and is directed upwardly thereby to lift the gate or arm 118. After the pin passes above the gate the same is returned to its normal position by the leaf spring 121 at which point the head will have reached the inner limit of its movement and will then start outwardly, the pin bearing on the upper surface of the gate and rib 111. It will thus be seen that the file is elevated above the teeth of the saw and out of the path of movement of the next file which will at this point have reached the outer extent of its movement and have gravitated through the groove defined by the rib 116 and the beveled outer end of the rib 116 and the beveled outer end of the rib 111 on to the upper surface of the rib 112; the said latter file will now be in a plane and position to engage the next adjacent tooth which has been fed in relative position thereto by the feeding mechanism to be acted upon thereby. The angularity of the plates 107 may be independently adjusted with respect to the guideways 51 to take up wear or lost motion at this point and the turn buckles 88 may be manipulated for a similar purpose. From the foregoing it will be seen that the machine when in operation automatically feeds the saw intermittently to present the alternate teeth respectively into the path of movement of each file.

The means for setting the teeth includes a spring arm 125 from the opposite sides of which setting hammers 126 are supported by the downwardly and rearwardly inclined arms 127. Each hammer is designed to coact with a rotatable anvil 128 mounted in a bifurcated supporting bracket 129. The anvils are provided with a plurality of faces of various inclinations whereby the setting of the teeth may be regulated in accordance with the use to which they are to be adapted. The means for actuating the hammers comprises a sleeve 130 slidably mounted on the forward extremity of the pin 87 and secured in place by a set screw 131. A lug 132 depends from the sleeve 130 and the rear free extremity of the spring arm 125 is disposed in the path of movement of the lug whereby said arm is alternately tripped in opposite directions upon operation of the slide bar 85. By adjusting the sleeve longitudinally on the pin 87 the extent of the throw of the spring arm is regulated to increase or decrease the blow of the hammers against the teeth.

It will thus be seen that a comparatively simple and inexpensive machine for sharpening and setting the teeth of a saw is provided, the accuracy of which eliminates the necessity of jointing the saw after the sharpening operation.

Having thus described my invention, what I claim is:

1. A saw sharpening machine comprising a frame, a saw supporting clamp mounted therein for longitudinal movements, mechanism for intermittently feeding the saw supporting clamp through the machine, means for regulating said mechanism to coincide with the gage of the tooth saw, transversely disposed guide members carried by the frame, a pair of sharpening elements, transverse reciprocatory members mounted in the guide members, vertical reciprocatory supporting members carried by the transverse reciprocating members for actuating the transverse reciprocatory members, and interengageable means on the guide members and the vertical reciprocating members adapted to coact upon movement of the transverse reciprocating members to alternately effect active engagement of the sharpening elements with alternate teeth of the saw.

2. A saw sharpening machine comprising a frame, a saw supporting clamp mounted therein for longitudinal movements, mechanism for intermittently feeding the saw supporting clamp through the machine, means for regulating said mechanism to coincide with the gage of the tooth saw, transversely disposed guide members carried by the frame, a pair of sharpening elements, transverse reciprocatory members mounted in the guide members, vertical reciprocatory supporting members carried by the transverse reciprocating members for actuating the transverse reciprocatory members, and interengageable means on the guide members and the vertical reciprocating members adapted to coact upon movement of the transverse reciprocating members to simultaneously effect transverse reciprocation of the sharpening elements in opposite directions and different vertical planes alternately whereby alternate teeth will be acted upon by each sharpening element successively.

3. In a machine as characterized in claim 2 in which means is provided for adjusting the vertical and horizontal angularity of the guide members.

4. In a machine as characterized in claim 2 in which independent means is provided for adjusting the vertical and horizontal angularity of the guide members.

5. A saw sharpening and setting machine comprising a stationary frame, a saw supporting member longitudinally movable therein, a feeding mechanism comprising a pinion mounted adjacent thereto, means for intermittently driving said pinion, means for regulating the intermittent movement thereof, a rack bar pivoted at one extremity to the saw supporting member and arranged parallel thereto, said rack bar adapted to gravitationally engage the pinion to afford means for connecting and disconnecting the saw supporting means with a feeding mechanism, in combination with transverse reciprocating tooth sharpening elements, and transversely operable tooth setting elements.

6. A device as characterized in claim 5 in which the means for intermittently driving the pinion comprises a gear operatively connected therewith, an arm on the gear shaft, a clutch arm eccentrically pivoted to said first arm, a double crank having trunnions adapted to alternately trip the clutch arm, and means for limiting the inactive movement of said clutch arm.

7. A device as characterized in claim 5 in which the means for intermittently driving the pinion comprises a gear operatively connected therewith, an arm on the gear shaft, a clutch arm eccentrically pivoted to said first arm, a double crank having trunnions adapted to alternately trip the clutch arm, and means for limiting the inactive movement of said clutch arm, and in which the means for regulating the intermittent movement of the actuating means comprises a means for adjusting said stop.

TITUS H. LAURY.